(12) United States Patent
Cunningham et al.

(10) Patent No.: US 10,860,888 B2
(45) Date of Patent: Dec. 8, 2020

(54) DETECTING OBJECTS IN IMAGES

(71) Applicant: Whirlpool Corporation, Benton Harbor, MI (US)

(72) Inventors: Kane Cunningham, Mountain View, CA (US); Gregory Allen Druck, Jr., San Francisco, CA (US); Brian Witlin, Mountain View, CA (US); Yuri Yuryev, Belmont, CA (US); Vadim Geshel, San Francisco, CA (US)

(73) Assignee: Whirlpool Corporation, Benton Harbor, MI (US)

( * ) Notice: Subject to any disclaimer, the term of this patent is extended or adjusted under 35 U.S.C. 154(b) by 81 days.

(21) Appl. No.: 16/238,462

(22) Filed: Jan. 2, 2019

(65) Prior Publication Data

US 2019/0213443 A1 Jul. 11, 2019

Related U.S. Application Data

(60) Provisional application No. 62/613,886, filed on Jan. 5, 2018.

(51) Int. Cl.
*G06K 9/62* (2006.01)
*G06K 9/32* (2006.01)
(Continued)

(52) U.S. Cl.
CPC ......... *G06K 9/6256* (2013.01); *G06K 9/3241* (2013.01); *G06K 9/627* (2013.01);
(Continued)

(58) Field of Classification Search
CPC ........ G06K 9/6256; G06K 9/627; G06K 9/78; G06K 9/3241; G06K 2209/17;
(Continued)

(56) References Cited

U.S. PATENT DOCUMENTS

| 9,373,057 B1 | 6/2016 | Ehran et al. |
| 2010/0014718 A1* | 1/2010 | Savvides ................ G06T 7/11 |
| | | 382/117 |

(Continued)

FOREIGN PATENT DOCUMENTS

| CN | 104573669 A | 4/2015 |
| CN | 107506793 A | 12/2017 |

OTHER PUBLICATIONS

Howard, A. et al., "MobileNets: Efficient Convolutional Neural Networks for Mobile Vision Applications," Google, Apr. 17, 2017, 9 pages [Online] [Retrieved Feb. 27, 2019], Retrieved from the internet <URL:https://arxiv.org/pdf/1704.04861.pdf>.

(Continued)

*Primary Examiner* — Nimesh Patel
(74) *Attorney, Agent, or Firm* — Fenwick & West LLP

(57) ABSTRACT

A system trains a computer model to classify images and to draw bounding boxes around classified objects in the images. The system uses a combination of partially labeled training images and fully labeled training images to train a model, such as a neural network model. The fully labeled training images include a classification label indicating a class of object depicted in the image, and bounding box or coordinate labels indicating a number of objects of the class in the image as well as the location of the objects of the class in the image. The partially labeled training images include a classification label but no indication of where in the image any objects of the class are located. Training the model using both types of training data makes it possible for the model to recognize and locate objects of classes that lack available fully labeled training data.

14 Claims, 7 Drawing Sheets

(51) Int. Cl.
*G06K 9/78* (2006.01)
*G06N 3/08* (2006.01)

(52) U.S. Cl.
CPC .............. *G06K 9/78* (2013.01); *G06N 3/08* (2013.01); *G06K 2209/17* (2013.01)

(58) Field of Classification Search
CPC .............. G06K 9/6274; G06K 9/6267; G06K 9/00288; G06K 9/6262; G06K 2209/05; G06K 9/00671; G06K 9/628; G06K 9/00664; G06K 9/00536; G06K 9/4604; G06K 9/4638; G06K 9/6202; G06K 9/6212; G06K 9/6229; G06K 9/623; G06K 9/6282; G06K 9/6296; G06K 9/4628; G06K 9/6271; G06K 2009/4666; G06K 9/6215; G06K 9/66; G06K 9/726; G06K 9/00; G06K 9/00624; G06K 9/00805; G06K 9/46; G06K 9/6218; G06K 9/6277; G06N 3/08; G06N 3/0454; G06N 3/04; G06N 20/00; G06N 3/082; G06N 3/0481; G06N 7/005; G06N 5/046; G06N 20/20; G06N 3/00; G06N 3/02; G06N 3/10; G06N 5/02; G06N 5/022; G06N 5/04; G06N 20/10; G06N 3/0445; G06N 3/049; G06N 3/048; G06N 5/003; G06N 5/025; G06T 2207/20081; G06T 2207/20084; G06T 7/0012; G06T 7/0014; G06T 7/11; G06T 2207/30168; G06T 7/0002; G06T 7/70; G06T 2207/10016; G06T 7/73; G06T 11/00; G06T 3/00; G06T 5/00; G06T 7/00; G06T 7/194; G06T 7/32; G06T 7/50; G06T 7/75; G06T 7/97; G06T 11/008; G06T 19/00; G06T 1/0014; G06T 2207/10004; G06T 2207/20021; G06T 2207/20212; G06T 5/001; G06T 5/009; G06T 5/20; G06T 5/40; G06T 7/136; G06T 7/174; G06T 7/74; G06T 7/80; G06T 9/002; G06F 16/9535; G06F 17/15; G06F 16/51; G06F 16/583; G06F 16/58; G06F 17/11; G06F 3/0484; G06F 16/35; G06F 16/353; G06F 16/434; G06F 16/4393; G06F 16/45; G06F 16/50; G06F 16/55; G06F 16/5866; G06F 21/36; G06F 16/24532; G06F 16/2465; G06F 16/2471; G06F 16/24578; G06F 16/248; G06F 16/53; G06F 16/532; G06F 16/538; G06F 16/29; G16H 30/40; G16H 50/20; G16H 10/60; G16H 50/70; G16H 10/00; G16H 20/30; G16H 50/50; C07K 16/18; C07K 16/30; C07K 2317/76; C07K 14/415; C07K 14/705; A61B 2562/0219; A61B 5/0022; A61B 5/1112; A61B 5/1118; A61B 5/1123; A61B 5/6898; A61B 5/7267; A61B 5/7475

See application file for complete search history.

(56) References Cited

U.S. PATENT DOCUMENTS

| | | | |
|---|---|---|---|
| 2012/0134576 A1* | 5/2012 | Sharma | G06K 9/6249 382/155 |
| 2014/0104385 A1* | 4/2014 | Wong | G06Q 10/10 348/46 |
| 2015/0032727 A1* | 1/2015 | Chung | G06F 16/9535 707/722 |
| 2016/0307072 A1* | 10/2016 | Zhou | G06K 9/66 |
| 2017/0116580 A1* | 4/2017 | Kim | G06Q 10/1095 |
| 2017/0293836 A1* | 10/2017 | Li | G06N 3/0445 |
| 2018/0089540 A1* | 3/2018 | Merler | G06K 9/4628 |
| 2018/0121768 A1* | 5/2018 | Lin | G06K 9/4628 |
| 2018/0232589 A1* | 8/2018 | Woo | G16H 20/30 |
| 2019/0108621 A1* | 4/2019 | Condorovici | G06K 9/6256 |
| 2019/0188776 A1* | 6/2019 | Hammond | G06Q 30/0639 |
| 2019/0197289 A1* | 6/2019 | Codella | G01N 33/02 |
| 2019/0213443 A1* | 7/2019 | Cunningham | G06K 9/78 |

OTHER PUBLICATIONS

Liu, W. et al., "SSD: Single Shot MultiBox Detector," Google and UNC Chapel Hill, Dec. 29, 2016, 17 pages [Online] [Retrieved Feb. 27, 2019], Retrieved from the internet <URL:https://arxiv.org/pdf/1512.02325.pdf>.

Erhan, D. et al., "Scalable Object Detection Using Deep Neural Networks," 2014 IEEE Conference on Computer Vision and Patter Recognition, Jun. 1, 2014, pp. 2155-2162.

Extended European Search Report, European Patent Application No. 19150376.2, dated Apr. 30, 2019, 136 pages.

Hou, S. et al., "VegFru: A Domain-Specific Dataset for Fine-grained Visual Categorization," 2017 IEEE International Conference on Computer Vision (ICCV), IEEE, Oct. 22, 2017, pp. 541-549.

Muresan, H. And Oltean, M., "Fruit recognition from images using deep learning," arxiv. Org, CoRR, vol. abs/1712.00580, Dec. 2, 2017, pp. 1-13 [Online] [Retrieved Apr. 12, 2019], Retrieved from the internet <URL:https://arxiv.org/abs/1712.00580v1>.

Su, C. et al., Multi-type attributes driven multi-camera person re-identification, *Pattern Recognition*, vol. 75, Sep. 12, 2017, pp. 77-89.

Wu, S. et al., "Deep Facial Action Unit Recognition from Partially Labeled Data," 2017 IEEE International Conference on Computer Vision (ICCV), IEEE, Oct. 22, 2017, pp. 3971-3979.

* cited by examiner

DETECTING OBJECTS IN IMAGES

CROSS REFERENCE TO RELATED APPLICATIONS

This application claims the benefit of U.S. Provisional Application No. 62/613,886, filed Jan. 5, 2018, the contents of which are incorporated herein by reference in their entirety.

BACKGROUND

Field of Art

This disclosure relates generally to computer vision, and in particular to using neural networks to detect objects in images.

Description of Art

Image analysis techniques such as object recognition are useful in a wide variety of technical systems such as autonomous vehicles and portrait photography. Typically, object recognition systems are trained using labeled training data. For example, to train a computer model to recognize whether or not a given image depicts a dog, the computer model must first be trained using images that are labeled with metadata indicating whether or not there is a dog shown in each of the training images.

Certain domains have a paucity of labeled training data. To the extent that there is training data available in a particular domain, it may not be labeled in a way that lends itself to training a computer model to complete certain analysis tasks. It is therefore difficult to develop object recognition systems for such domains due to the inability to properly and comprehensively train the systems because of the lack or unsuitability of training data. The utility of an object recognition system is thus lessened because systems can be used only in certain domains.

SUMMARY

The above and other needs are met by methods, non-transitory computer-readable storage media, and computer systems for recognizing objects in images. A method includes acquiring an image depicting objects for analysis. The method further includes recognizing an object in the image using a neural network model. The parameters of the neural network model are trained by reducing a loss function. The loss function includes a first portion that indicates a dissimilarity between actual training labels of a fully labeled training image and predicted classifications for the fully labeled training image. The loss function also includes a second portion that indicates a dissimilarity between actual training labels of a partially labeled training image and predicted classifications for the partially labeled training image. Responsive to recognizing an object in the analyzed image, a system can provide visual feedback related to the recognized object to a user of a client device and can perform requested services based on the recognized object.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

Figure (FIG. 1 is a high-level block diagram illustrating a system environment for training an object detection system, in accordance with an embodiment.

Figure 1:
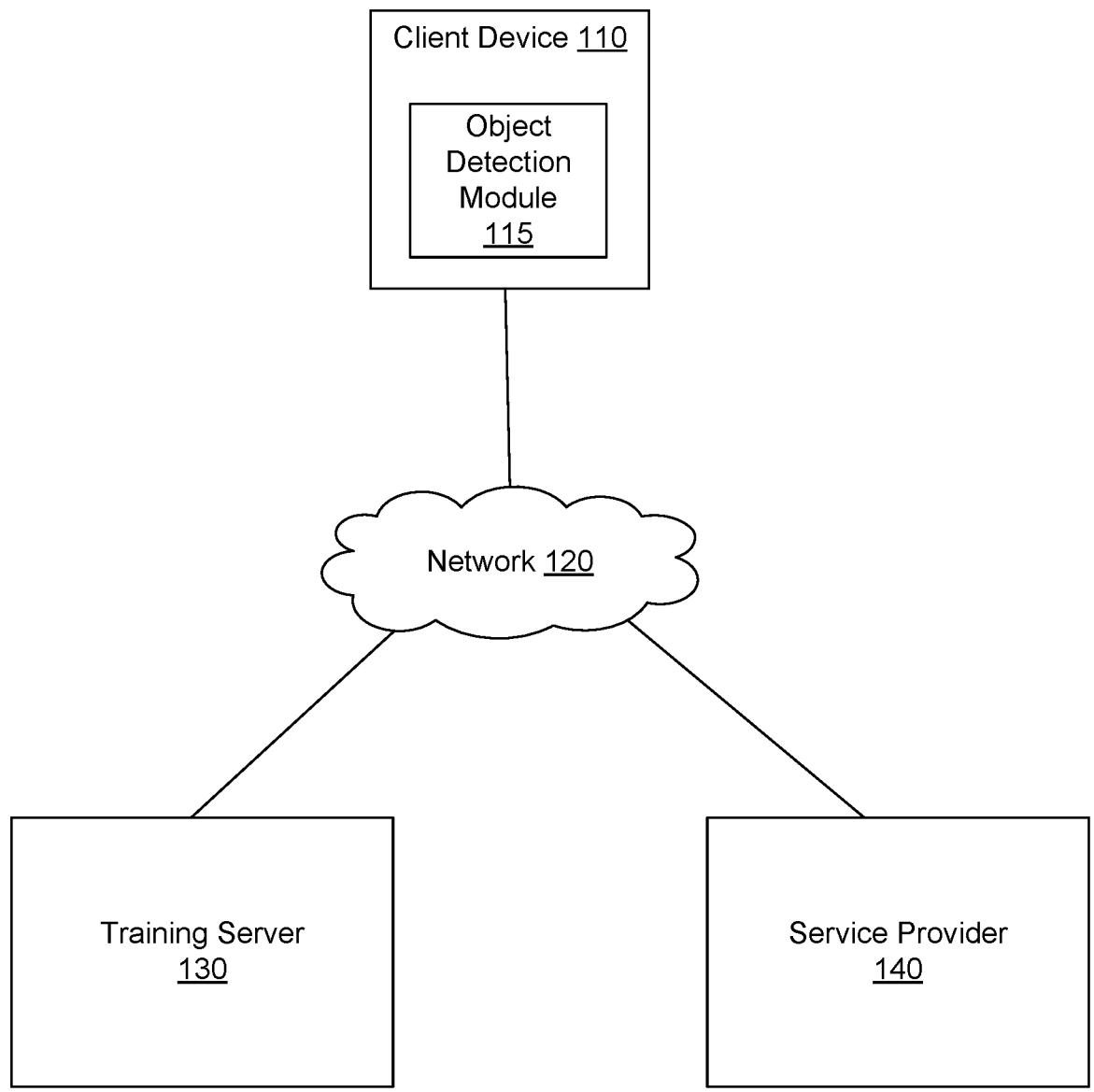

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

A system trains a computer model to classify images and to draw bounding boxes around classified objects in the images. A bounding box is an indication of the region of an image in which an object is depicted. For example, a bounding box may be a rectangle, a set of coordinates, or another shape that indicates approximate or exact boundaries of an object within an image.

In some embodiments, the computer model has a convolutional neural network architecture or another neural network structure for image analysis. A training algorithm for training parameters of the neural network allows a subset of the training data to be provided without bounding box labels. These training images are referred to as partially labeled training images. For example, a training image may be labeled with a class of object that is shown in the image, but without training labels indicating a number of the objects or their location within the training image. The training data also includes fully labeled training images. The fully labeled examples are training images that include classification labels indicating objects that are visible in the image and bounding box labels indicating a location of each of the objects of each class in the image.

During a training step, parameters of the neural network are adjusted according to error terms generated by applying one or more loss functions to the training images. A first loss function evaluates a loss related to the fully labeled training images. A second loss function evaluates a loss related to the partially labeled training images. The loss is a function of the parameters of the computer model. In one embodiment, the one or more losses obtained from the first loss function and the second loss function are minimized using numerical optimization, for example, variants of gradient descent. In one embodiment, the first loss function and the second loss function are the same loss function, but the function includes functionality that responds to either the fully labeled training images, or to the partially labeled training images, depending on the inclusion of training labels associated with each image. Using both loss functions to train the neural network parameters enables the system to learn to generate bounding boxes around object classes for which little or no training data with bounding box labels exists.

In one example embodiment, the described training scheme is used to train a neural network to identify food ingredients within a video feed. For example, a mobile application may provide recipe suggestions to a user based on a list of ingredients that the user has available. To generate the ingredients list, the user can take a picture or a video of the available food ingredients. In some embodiments, these pictures are collected by a device or appliance such as a smart refrigerator. The image (or set of images sampled from frames of a video) is provided as input to the trained neural network system which outputs a classification of the ingredients in the image and the region of the image where the ingredients are depicted. When the system returns a high enough likelihood that a particular food ingredient is in an image, the application may add the ingredient to the ingredient list for the user for suggesting recipes that use the ingredient. The trained neural network also outputs a likely location of the food ingredient identified in the image and may produce a bounding box to display to the user demonstrating that the ingredient has been identified. Although this example is used throughout this document, the neural network training system and loss functions that are described can be applied in a variety of use cases and are not limited to the use cases described herein.

Training an object recognition system using partially labeled training images in addition to fully labeled training images makes it possible to develop a better object recognition system than if only one type of training images was used. The inclusion of partially labeled training images allows the system to be trained on a wide variety of image classes which may lack comprehensive training labels. In particular, an object recognition system can be trained in localization (i.e., identifying a location of an object that is detected in an image) of a class of objects for which the training data for the class has few bounding box labels. For example, it is difficult to find fully labeled training images that identify the location of a raw chicken breast in an image. However, this information would be useful in the example of the food identification application described previously. Instead, partially labeled training images that are known to show at least one raw chicken breast can be included in the training data and fully labeled training images from other classes of objects can be used to train the system to localize identified objects within the images.

FIG. 1 is a high-level block diagram illustrating a system environment for training an object detection system, in accordance with an embodiment. FIG. 1 includes a client device 110, a network 120, a training server 130, and a service provider 140. For clarity, only one client device 110 is shown in FIG. 1. Alternate embodiments of the system environment can have any number of client devices 110 as well as multiple training servers 130 and service providers 140. The functions performed by the various entities of FIG. 1 may vary in different embodiments.

The training server 130 trains a computer model to detect objects within images. In some embodiments the computer model is further trained to identify the location of detected objects within the images. For example, the computer model may be trained to generate a set of coordinates or draw a bounding box that is likely to include the detected object. The training server 130 is described in more detail in the description of FIG. 2.

In one embodiment, a user may access the trained computer model to perform object detection through a client device 110. Client devices 110 can be personal or mobile computing devices, such as smartphones, tablets, or notebook computers. Client devices 110 can also be other computer devices such as desktop computers, appliances, automobiles, or any other computing device that can provide image data for analysis. In some embodiments, the client device 110 includes a display screen that can display images and provide a user interface. In some embodiments, a client device 110 has a camera to capture an image for analysis. The camera on a client device 110 may capture videos or still images.

In some embodiments, the computer model may be accessed via an object detection module 115. The object detection module 115 may be a mobile application or other form of application running on the client device. In some embodiments, the object detection module 115 may include a trained computer model that can be used for image analysis on the client device 110. In another embodiment, the object detection module 115 may access a computer model or other functionality at a remote system, such as the service provider 140. The object detection module 115 is described in more detail in the description of FIG. 3.

The service provider 140 is a backend system, such as a server, or other computing device. In some embodiments, the service provider 140 may store and distribute applications, such as the object detection module 115. The service provider 140 may also provide backend support for the object detection module 115. In some embodiments, the service provider 140 maintains a cloud service for object detection which can be accessed by the object detection module 115 on the client device 110. In such an embodiment, one or more computer models that were trained by the training server 130 may be stored on the service provider 140, and the service provider 140 may apply the computer models to images to generate image analysis results, such as object detection and localization, for an object detection module 115 making a request.

Client devices 110, the service provider 140, and the training server 130 can communicate via the network 120. The network 120 may comprise any combination of local area and wide area networks employing wired or wireless communication links. In some embodiments, all or some of the communication on the network 120 may be encrypted.

Figure 2:
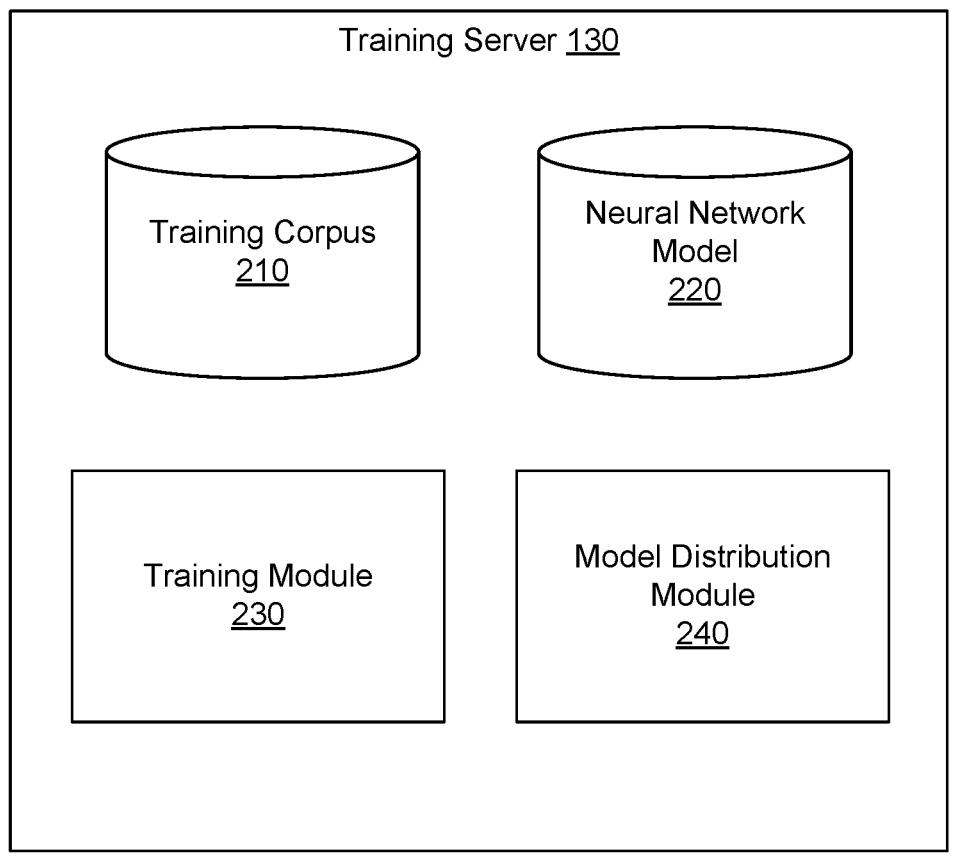
FIG. 2 is a high-level block diagram illustrating an architecture of a training server, in accordance with an embodiment.

FIG. 2 is a high-level block diagram illustrating an architecture of a training server, in accordance with an embodiment. The training server 130 includes various modules and data stores for training computer models to detect objects within images. In one embodiment, the training server 130 comprises a training corpus 210, a neural network model 220, a training module 230, and a model distribution module 240. Computer components such as web services, network interfaces, security functions, load balancers, failover services, and management and network operations consoles are not shown so as to not obscure the details of the system architecture. Additionally, the training server 130 may contain more, fewer, or different components than those shown in FIG. 2 and the functionality of the components as described herein may be distributed differently from the description herein.

The training corpus 210 stores training data for training computer models. The training data stored in the training corpus 210 may be data related to certain classes or categories, depending on what types of objects or concepts the training server 130 is training the neural network model 230 to recognize. For example, to train a neural network to recognize food ingredients in an image, the training server 130 may use a training set including pictures of food ingredients, where each picture is labeled with corresponding classifications (e.g., a type of food or foods that are visible in the image) such as: orange, apple, bread, milk, bell pepper, carrot, cheese, etc. In some embodiments, a single training image as stored in the training corpus 210 may have multiple class labels, for example, if the training image depicts objects or concepts of more than one class. The training corpus 210 stores partially labeled training data and fully labeled training data.

The partially labeled training data includes images that are labeled with a class of object that is shown in the image, but that do not include training labels indicating a number of the objects of the class or their locations within the training image. For example, a metadata accompanying a partially labeled training image of a bowl of fruit may include a class label "orange" indicating that at least one orange is depicted in the image. However, the metadata in this example does not include labels indicating a number of oranges shown in the training image nor locations of the one or more oranges in the image.

The fully labeled training data stored in the training corpus 210 includes images that are labeled with a class of object that is shown in the image as well as labels (i.e., some format of metadata such as coordinates or bounding boxes) that indicate the number of objects of the class in the image and the locations of the objects within the image. For example, a fully labeled training image depicting a bowl of fruit may be assigned the class label "orange" indicating there is an orange somewhere in the image, and would further include bounding box or coordinate labels indicating where each orange in the image is located.

In some embodiments, the computer model trained by the training server is a convolutional neural network. Trained parameters and other data for the neural network architecture are stored as a neural network model 220. In various embodiments, the training server 130 may store multiple neural network models 220. The neural network model 220 may be a convolutional neural network and in different embodiments may have different underlying network architectures. The neural network model 220 includes a set of parameters that are trained using training data from the training corpus 210. In one embodiment, the neural network model 220 is trained to accept an image as input and to generate an output that specifies likelihoods that objects or concepts of different classifications are depicted at regions of the image. Hence, the output of the neural network model 210 indicates a classification and a location within an image of objects it has been trained to recognize.

The training module 230 facilitates training of the neural network model 220. Facilitating training of the neural network model 220 may include providing partially labeled training data and fully labeled training data from the training corpus 210 to the neural network model 220 as inputs and updating values of the parameters of the neural network model 220 (i.e., by reducing a loss function). During training, the neural network model 220 accepts labeled images as training data and generates outputs that specify likelihoods that various object classifications are depicted in regions of the images. For each training image, a loss function is applied to the output of the neural network model 220 and the loss is backpropagated through the neural network model 220 to adjust the parameters of the neural network model. In one embodiment, the training step includes determining, using loss functions, one or more error terms based on a difference between the classifications and identified locations of objects within labeled images and the output of the neural network model 220 that provides predicted classifications and locations for objects in the training image. The error terms are backpropagated through the neural network architecture and used to update weight values in the neural network model 220 to reduce the total loss.

In one embodiment, the loss function used to train the neural network model 220 accounts for both partially labeled training data and fully labeled training data. A loss function for partially labeled training data is combined (e.g., combined using a weighted sum) with a loss function for fully labeled training data to compute a total loss against which the neural network model 220 is optimized. In this way, the neural network model 220 is trained using a combination of the two types of data (i.e., partially and fully labeled). In some embodiments, the loss functions may be weighted such that error terms obtained from one loss function have a greater effect on the adjustment of parameters of the neural network model 220 than error terms obtained from the other loss function. Using both classes of training data makes it possible to train the neural network model 220 to identify and locate categories of objects that would otherwise be difficult to incorporate into the model. For example, for some categories of objects that have very little existing training data that includes bounding box labels, the neural network model 220 can still learn to localize the objects based on the partially labeled training data.

Mathematically, the combined loss function is:

$$L = \Sigma_{i \in P} L_{Pi} + \Sigma_{i \in F} L_{Fi}$$

Where L is the total loss, $L_P$ is the loss from partially labeled examples, where each of the partially labeled examples is an image i, and $L_F$ is the loss from fully labeled examples, where each of the fully labeled examples is an image i. In one embodiment, the fully labeled loss component, $L_F$, is calculated as the weighted sum of the cross-entropy loss across predicted and actual class labels, and the localization loss of predicted and actual bounding box coordinates (e.g., smooth L1 norm loss).

The partially labeled loss component, $L_{Pi}$, for a single image i, is computed as:

$$L_{Pi} = -\Sigma_j [y_{ij} \log(\hat{y}_{ij}) + (1 - y_{ij}) \log(1 - \hat{y}_{ij})]$$

Where $y_{ij}$ and $\hat{y}_{ij}$ are the actual and predicted values for the ith label of the jth class respectively, and:

$$\hat{y}_{ij} = 1 - \Pi_a (1 - p_{aij})$$

Where $p_{aij}$ is the predicted probability of the jth class for the ath region of interest in image i. Accordingly, $\hat{y}_{ij}$ is the probability that the image i contains at least one object of the class j under the assumption that the presence of an object of class j in each of a set of regions of the image is drawn from a Bernoulli distribution with a probability of success of $p_{aij}$.

The model distribution module 240 provides trained neural network models 220 to client devices 110 or service providers 140. In some embodiments, a trained neural network model 220 may be incorporated into an application, such as the object detection module 115, that is then provided to client devices 110 by the service provider 140. In other embodiments, the training server 130 or service provider 140 may host the neural network model 220 as a cloud service that can be accessed by a client device 110.

Figure 3:
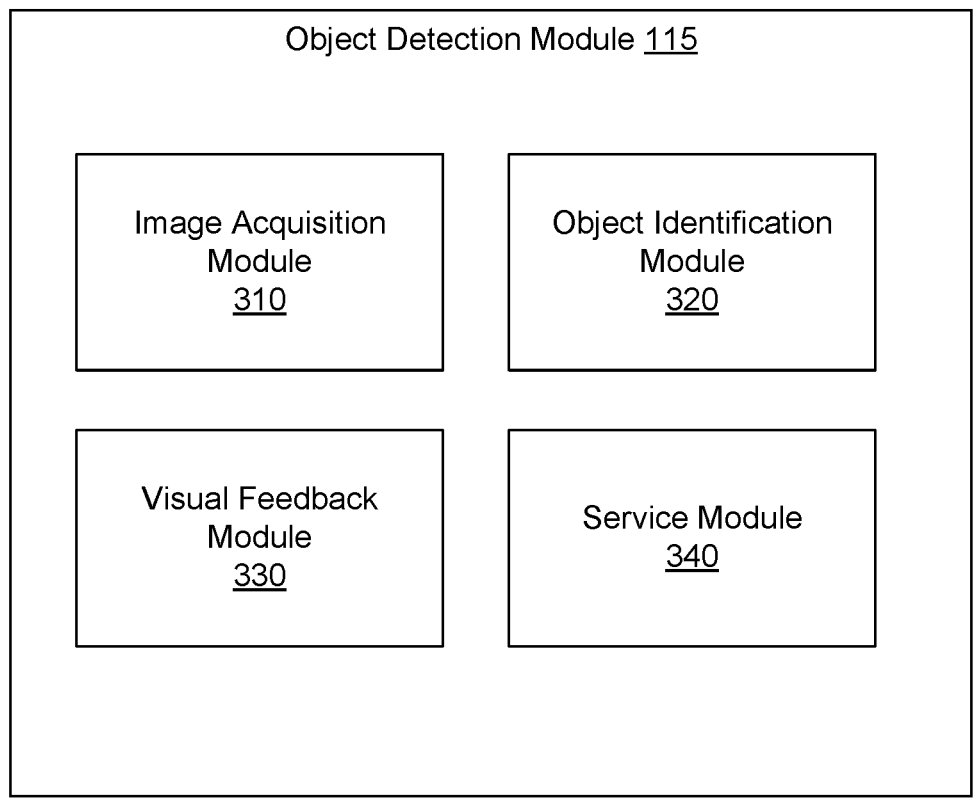
FIG. 3 is a high-level block diagram illustrating an architecture of an object detection module, in accordance with an embodiment.

FIG. 3 is a high-level block diagram illustrating an architecture of an object detection module, in accordance with an embodiment. The object detection module 115 may include various modules and data stores for detecting objects within images and providing feedback to a user based on the detected objects. In one embodiment, the object detection module 115 comprises an image acquisition module 310, an object identification module 320, a visual feedback module 330, and a service module 340. Other components such as web services, network interfaces, security functions, load balancers, failover services, and management and network operations consoles are not shown so as to not obscure the details of the system architecture. Additionally, the object detection module 115 may include more, fewer, or different components than those shown in FIG. 3 and the functionality of the components as described herein may be distributed differently from the description herein.

The image acquisition module 310 obtains images for analysis. The images may come from a variety of sources in different embodiments. In one embodiment, the image acquisition module 310 obtains videos comprising a set of images in the form of video frames. The images may be captured by a camera of the client device 110 and received by the object detection module 115. The images may also be received from other sources, such as from a remote system communicating with the client device 110 over the network 120. In some embodiments, the images may be received by the image acquisition module 310 and analyzed in real-time by the object identification module 320. That is, a user may be filming a video on the client device and sending the video feed directly to the object detection module 115 which may produce a visual feedback for the user related to the scene being filmed.

Object identification module 320 performs analysis on images received at the image acquisition module 310. The object identification module 320 accesses the trained neural network model 220 and provides an image to the neural network model 220 as input. The neural network model 220 produces an output that identifies objects in the image. In one embodiment, the output of the neural network model 220 comprises sets of region-by-category probability values that represent, for each region of an image, a likelihood that an object of the particular category (i.e., classification) is depicted at that region. For example, the neural network model 220 might divide the image into overlapping regions of interest and may output probabilities (one for each region of interest) representing a likelihood that each region of interest depicts an orange, probabilities representing a likelihood that each region of interest depicts a carrot, probabilities representing a likelihood that each region of interest depicts cheese, and so on for some or all of the classifications that the neural network 220 was trained to recognize. In some embodiments, the neural network model 220 also generates bounding box coordinates that are likely to identify the location of objects in the image. The bounding box coordinates may be generated by the object identification module 320 based on the regional probabilities output by the neural network 220.

The object identification module 320 may use information from multiple images to classify and locate objects in a scene. In one embodiment, the image acquisition module 310 receives frames of a video for analysis. The object identification module 320 may perform a smoothing operation when determining a probability that an object is depicted in a scene. The smoothing operation may include sampling frames from a video and analyzing each of the sampled frames with the neural network model 220. The output of the image analysis for each of the sampled frames may then be combined (e.g., compared, averaged, etc.) to determine a likelihood that an object is in a part of a scene that is depicted in the video. This smoothing reduces false positive results in recognizing objects within a scene. For example, if several frames of a video are classified by the neural network model 220 as likely to depict an orange, it can be predicted that there is an orange shown in the scene with higher confidence than if just one image of the scene was analyzed. Analyzing frames sampled from a video feed also helps to ameliorate errors resulting from users who do not hold their client devices steady while filming a scene. For example, if a user moves the camera of a client device 110, it may result in some objects being present in only some of the frames of a video sent to the object detection module 115 and assessing predicted classifications and localizations of objects among the multiple images helps to predict objects in a scene.

The visual feedback module 330 generates user interface features for the object detection module 115 to display to a user. In some embodiments, the visual feedback module 330 generates bounding boxes and object labels to display to a user, for example, as overlaid on an image or video presented on a display of the client device 110. In some cases, the labels and bounding boxes may be shown on top of a video as the user continues to take more video for analysis. For example, if there is an object the user wants the object detection module 115 to detect, but which the object detection module 115 has not yet labeled in the scene, the user can focus the video on that object until a label or bounding box appears.

The visual feedback module 330 uses predictions output by the neural network model 220 to generate labels and bounding boxes to display at the client device 110. The visual feedback module 330 may determine a label should be added to an image once a classification of the image that has been generated with sufficient probability (i.e., greater than a predetermined threshold probability that a particular object is displayed in the image or set of images). Similarly, the visual feedback module 330 generates bounding boxes to display on an image if the output of the neural network 220 indicates an object in a particular region of the image with greater than a predetermined threshold probability.

The service module 340 performs additional services and actions for the object detection module 115. Services performed by the service module 340 may be in response to user requests or in response to the detection of objects by the object identification module 320. The service module 340 facilitates accessing and providing any required data for performing the service. In one example use case, the object detection module 115 identifies ingredients in a video feed from the client device 110 and generates an ingredient list and suggested recipes for using the ingredients. In the example use case, the service module 340 may interact with the visual feedback module 330 to produce and generate an ingredients list for display to the user. The service module 340 may also search a database of recipes to access and provide recipes that use the ingredients in the ingredients list.

In another example use case, the service module 340 facilitates inventory management. In this example use case, cameras built into appliances (e.g., a refrigerator) are used to detect food items, monitor depletion, schedule replenishment, and interact with meal planning systems. The system infers what items might need to be replenished based on historical data and optical quantity estimation. In some cases, the appliance can automatically order items or may send a reminder to a user to purchase more of a certain item.

Figure 4:
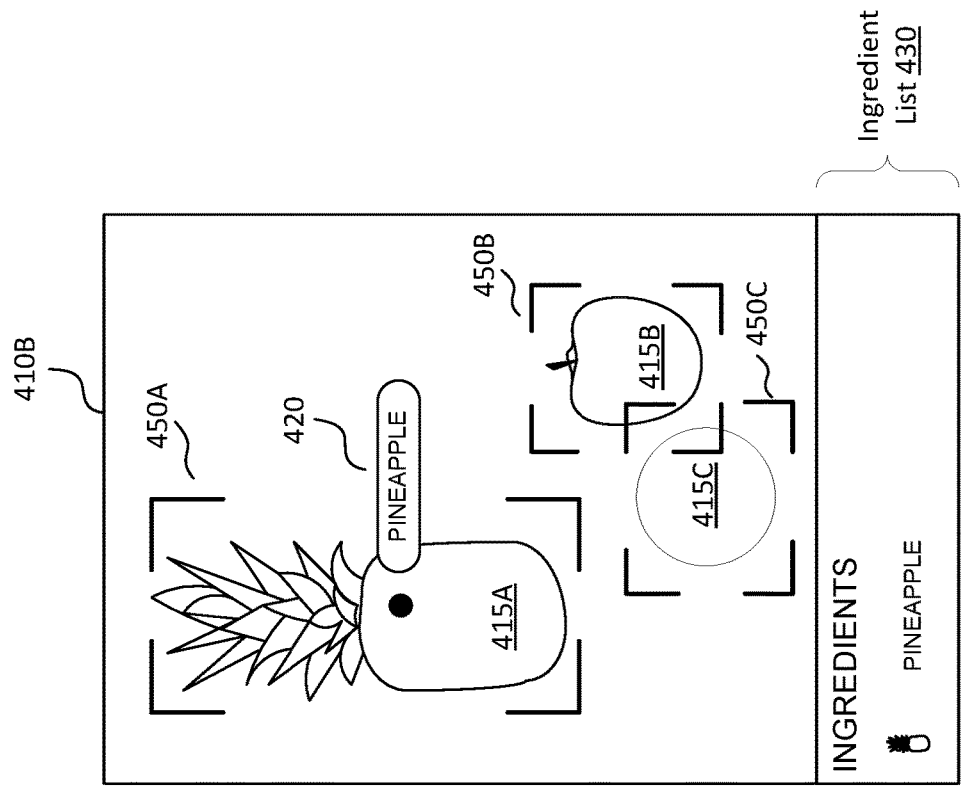
FIG. 4 is an example user interface that provides visual feedback based on image analysis from the object detection module, in accordance with an embodiment.
Figure 4:
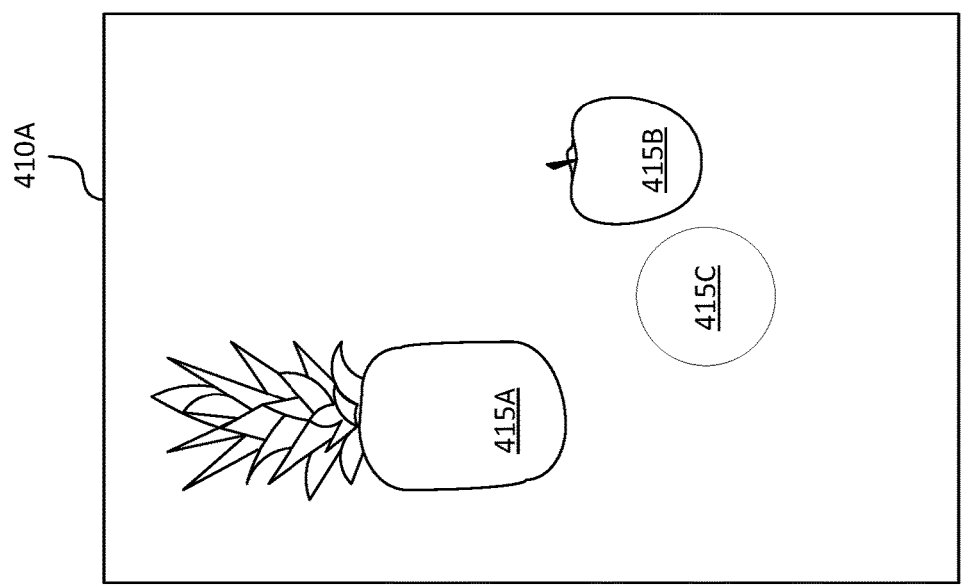

FIG. 4 is an example user interface that provides visual feedback based on image analysis from the object detection module 115, in accordance with an embodiment. FIG. 4 shows a user interface 410A that displays a video feed. The video feed includes objects 415A, 415B, and 415C. In the second image, the video feed has been sampled and analyzed by the neural network model 220. The user interface 410B now includes additional information displayed for the user based on the generated output of the neural network model 220. For example, the visual feedback module 330 displays bounding boxes 450A, 450B, and 450C indicating regions where the object identification module 320 has identified objects 415A, 415B, and 415C, respectively. The user interface 410B also includes an ingredient label 420 and an ingredient list 430 that indicate that object 415A has been classified with a high probability of being a pineapple. In the example of FIG. 4, the object detection module 115 may need to process additional frames of the video before it can identify object 415C and object 415B with enough confidence to present a label 420.

Figure 5:
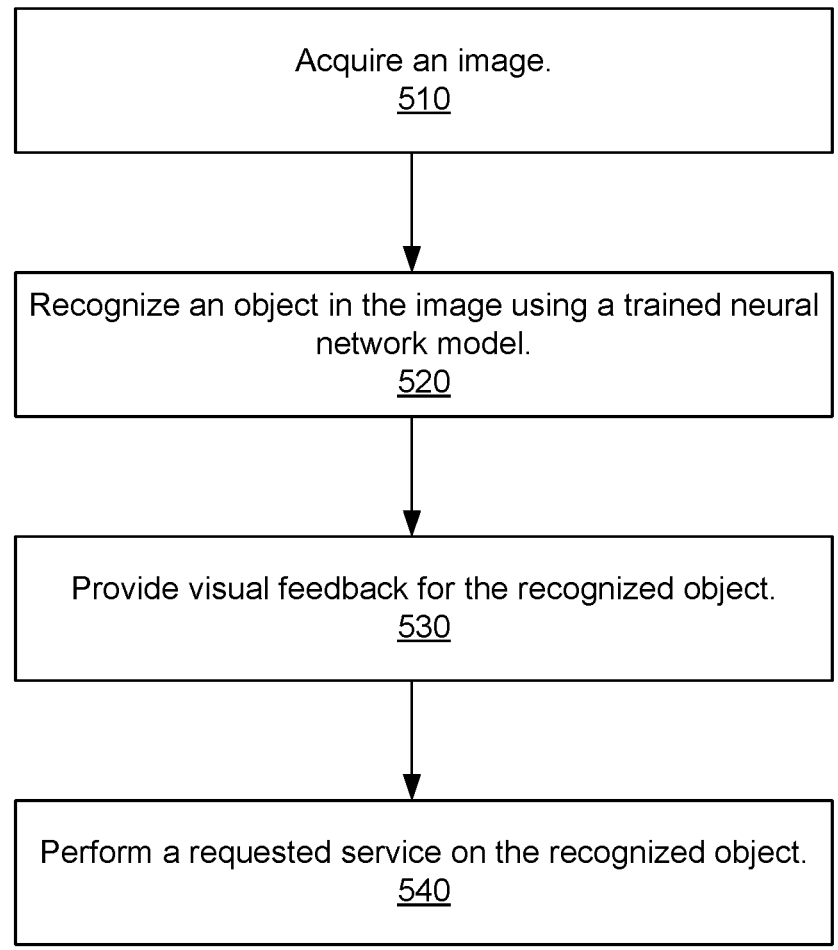
FIG. 5 is a flowchart illustrating a process of performing object recognition on an image, in accordance with an embodiment.

FIG. 5 is a flowchart illustrating a process of performing object recognition on an image, in accordance with an embodiment. The object detection module 115 acquires 510 an image or, in some embodiments, a set of images sampled from a video feed. The object detection module 115 recognizes 520 an object in the image using a trained neural network model 220. Using classifications and location predictions output by the neural network model 220, the object detection module 115 generates and provides 530 visual feedback for the recognized object. For example, the object detection module 115 may generate bounding boxes and object labels that identify objects recognized in the image for display at the client device 115. Finally, the object detection module 115 performs 540 a requested service on the recognized object. For example, the object detection module 115 might recognize a list of ingredients in the image and perform a service such as accessing a recipe database, obtaining a list of recipes that can be made with the available ingredients, and displaying the list for access by a user of the client device.

Figure 6:
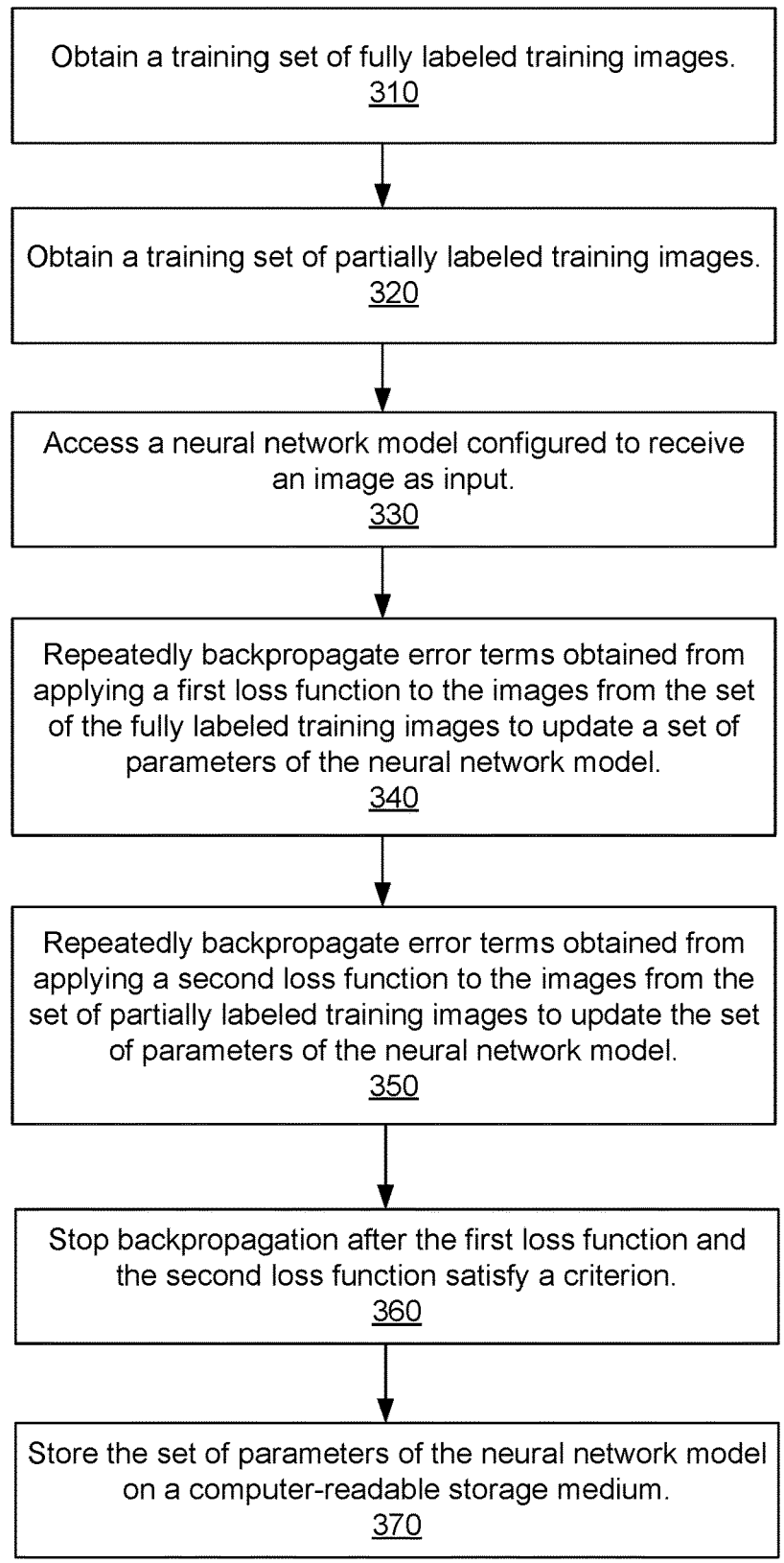
FIG. 6 is a flowchart illustrating a process of training an object detection system, in accordance with an embodiment.

FIG. 6 is a flowchart illustrating a process of training an object detection system, in accordance with an embodiment. The training module 230 obtains 310 a set of fully labeled training images. A fully labeled training image may include a classification of objects in the image as well as information about a region of the image where each of the objects of that class is depicted. The training module 230 also obtains 320 a training set of partially labeled training images. A partially labeled training image may include a classification of a type of object in the image, but does not include information about how many objects of the class appear in the image or about where in the image the objects of the class are located.

The training module 230 accesses 330 a neural network model 220 configured to receive an image as input. The neural network model 220 is applied to a plurality of the images in the set of fully labeled training images. Error terms obtained from a first loss function are repeatedly backpropagated 340 through the neural network model 220 to update a set of parameters of the neural network model 220. The first loss function may be the portion of an overall loss function that accounts for a discrepancy between an actual location of each classified object in the fully labeled training image and the predicted location and classification of objects in the fully labeled training image as produced by the neural network model 220. The neural network model 220 is also applied to a plurality of the images in the set of partially labeled training images. Error terms obtained from a second loss function are repeatedly backpropagated 350 through the neural network model 220 to update the set of parameters of the neural network model 220. The second loss function may be the portion of an overall loss function that accounts for a discrepancy between an actual classification of an image and the predicted classification of the image as produced by the neural network model 220. The training module 230 stops 370 backpropagation of the error terms through the neural network model 220 after both the first loss function and the second loss function satisfy a criterion, for example, once the error terms are within a predetermined acceptable range. The set of parameters of the neural network model 220 are stored 370 on a computer-readable storage medium as a trained neural network model 220 and can be accessed to classify images and generate bounding boxes for classified objects identified in the images.

Figure 7:
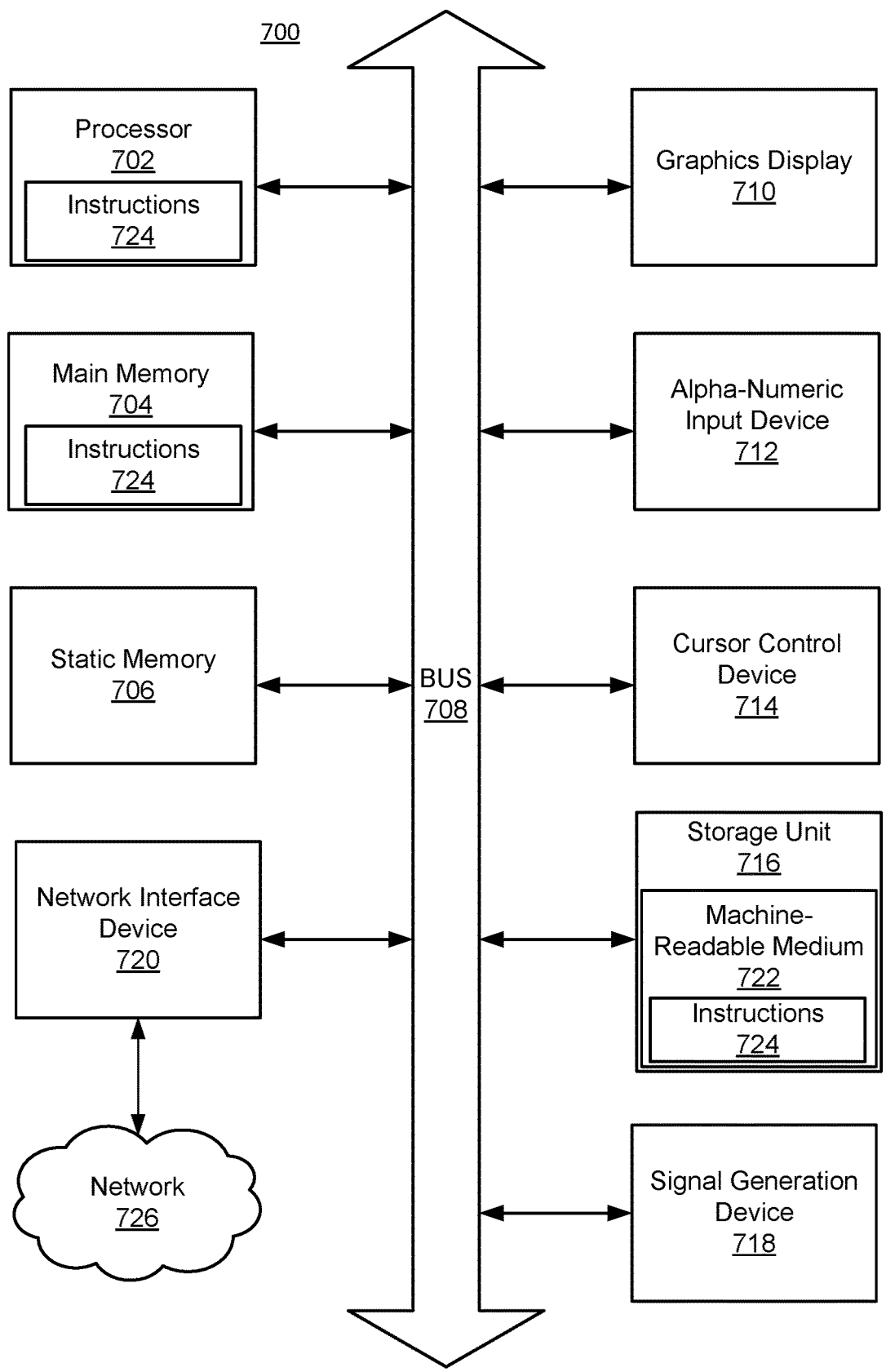
FIG. 7 is a block diagram illustrating components of an example machine for reading and executing instructions from a machine-readable medium, in accordance with an embodiment.

FIG. 7 is a block diagram illustrating components of an example machine able to read instructions from a machine-readable medium and execute them in one or more processors (or controllers). Specifically, FIG. 7 shows a diagrammatic representation of training server 130 in the example form of a computer system 700. The computer system 700 may also be representative of client device 115 or service provider 140 in some embodiments. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704, and the storage unit 716 communicate via a bus 708.

In addition, the computer system 700 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include instructions for implementing the functionalities of the training module 230 and the model distribution module 240. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
acquiring, by a client device, an image depicting an object;
recognizing the object in the image using a trained computer model; and
performing a requested service on the recognized object;
wherein training the computer model comprises:
obtaining a set of fully labeled training images comprising a plurality of images that include classification labels indicating classes of objects in the image and bounding box labels indicating locations of objects in the image;
obtaining a set of partially labeled training images comprising a plurality of images that include classification labels indicating classes of objects in the image and that do not include bounding box labels indicating locations of objects in the image; and
reducing a loss function, the loss function comprising:
a first portion indicating a dissimilarity between actual labels of a fully labeled training image from the set of fully labeled training images and predicted classifications for the fully labeled training image, wherein the first portion of the loss function comprises:
a classification loss indicating a dissimilarity between a predicted classification of one or more objects in the fully labeled image and an actual classification of the one or more objects in the fully labeled image; and
a localization loss indicating a dissimilarity between a set of predicted bounding box coordinates for the one or more objects in the fully labeled image and the set of actual bounding box coordinates for the one or more objects in the fully labeled image; and
a second portion indicating a dissimilarity between actual labels of a partially labeled training image from the set of partially labeled training images and predicted classifications for the partially labeled training image, wherein the second portion of the loss function comprises:
a classification loss indicating a dissimilarity between a predicted classification of one or more objects in the partially labeled image and an actual classification of the one or more objects in the partially labeled image.

2. The computer-implemented method of claim 1, further comprising providing visual feedback in a user interface on a display of a client device based on the recognized object, the visual feedback comprising bounding boxes identifying an estimated location of the object in the image.

3. The computer-implemented method of claim 1, wherein error terms obtained from the first portion of the loss function are weighted such that they have a greater effect on the parameters of the computer model than the error terms obtained from the second portion of the loss function.

4. The computer-implemented method of claim 1, wherein the computer model is trained to recognize food ingredients, and wherein performing the requested service on the recognized object comprises:
   identifying a food ingredient classification represented by the recognized object;
   adding the identified food ingredient to a list of identified food ingredients;
   requesting, from a server configured to provide recipe information, a set of recipes that include the food ingredients in the list of identified food ingredients;
   receiving the set of recipes that include the food ingredients in the list of identified food ingredients; and
   displaying at least one of the set of recipes at the user interface of the client device.

5. The computer-implemented method of claim 1, wherein acquiring an image comprises capturing the image using a camera on the client device.

6. A system comprising:
   a processor for executing computer program instructions; and
   a non-transitory computer-readable storage medium storing computer program instructions executable by the process to perform steps comprising:
      acquiring, by a client device, an image depicting an object;
      recognizing the object in the image using a trained computer model; and
      performing a requested service on the recognized object;
      wherein training the computer model comprises:
         obtaining a set of fully labeled training images comprising a plurality of images that include classification labels indicating classes of objects in the image and bounding box labels indicating locations of objects in the image;
         obtaining a set of partially labeled training images comprising a plurality of images that include classification labels indicating classes of objects in the image and that do not include bounding box labels indicating locations of objects in the image; and
         reducing a loss function, the loss function comprising:
            a first portion indicating a dissimilarity between actual labels of a fully labeled training image from the set of fully labeled training images and predicted classifications for the fully labeled training image, wherein the first portion of the loss function comprises:
               a classification loss indicating a dissimilarity between a predicted classification of one or more objects in the fully labeled image and an actual classification of the one or more objects in the fully labeled image; and
               a localization loss indicating a dissimilarity between a set of predicted bounding box coordinates for the one or more objects in the fully labeled image and the set of actual bounding box coordinates for the one or more objects in the fully labeled image; and
            a second portion indicating a dissimilarity between actual labels of a partially labeled training image from the set of partially labeled training images and predicted classifications for the partially labeled training image, wherein the second portion of the loss function comprises:
               a classification loss indicating a dissimilarity between a predicted classification of one or more objects in the partially labeled image and an actual classification of the one or more objects in the partially labeled image.

7. The system of claim 6, further comprising providing visual feedback in a user interface on a display of a client device based on the recognized object, the visual feedback comprising bounding boxes identifying an estimated location of the object in the image.

8. The system of claim 6, wherein error terms obtained from the first portion of the loss function are weighted such that they have a greater effect on the parameters of the computer model than the error terms obtained from the second portion of the loss function.

9. The system of claim 6, wherein the computer model is trained to recognize food ingredients, and wherein performing the requested service on the recognized object comprises:
   identifying a food ingredient classification represented by the recognized object;
   adding the identified food ingredient to a list of identified food ingredients;
   requesting, from a server configured to provide recipe information, a set of recipes that include the food ingredients in the list of identified food ingredients;
   receiving the set of recipes that include the food ingredients in the list of identified food ingredients; and
   displaying at least one of the set of recipes at the user interface of the client device.

10. The system of claim 6, wherein acquiring an image comprises capturing the image using a camera on the client device.

11. A non-transitory computer-readable storage medium storing computer program instructions executable by a processor to perform operations comprising:
   acquiring, by a client device, an image depicting an object;
   recognizing the object in the image using a trained computer model; and
   performing a requested service on the recognized object;
   wherein training the computer model comprises:
      obtaining a set of fully labeled training images comprising a plurality of images that include classification labels indicating classes of objects in the image and bounding box labels indicating locations of objects in the image;
      obtaining a set of partially labeled training images comprising a plurality of images that include classification labels indicating classes of objects in the image and that do not include bounding box labels indicating locations of objects in the image; and
      reducing a loss function, the loss function comprising:

a first portion indicating a dissimilarity between actual labels of a fully labeled training image from the set of fully labeled training images and predicted classifications for the fully labeled training image, wherein the first portion of the loss function comprises:
  a classification loss indicating a dissimilarity between a predicted classification of one or more objects in the fully labeled image and an actual classification of the one or more objects in the fully labeled image; and
  a localization loss indicating a dissimilarity between a set of predicted bounding box coordinates for the one or more objects in the fully labeled image and the set of actual bounding box coordinates for the one or more objects in the fully labeled image; and
a second portion indicating a dissimilarity between actual labels of a partially labeled training image from the set of partially labeled training images and predicted classifications for the partially labeled training image, wherein the second portion of the loss function comprises:
  a classification loss indicating a dissimilarity between a predicted classification of one or more objects in the partially labeled image and an actual classification of the one or more objects in the partially labeled image.

12. The non-transitory computer-readable storage medium of claim 11, the operations further comprising providing visual feedback in a user interface on a display of a client device based on the recognized object, the visual feedback comprising bounding boxes identifying an estimated location of the object in the image.

13. The non-transitory computer-readable storage medium of claim 11, wherein error terms obtained from the first portion of the loss function are weighted such that they have a greater effect on the parameters of the computer model than the error terms obtained from the second portion of the loss function.

14. The non-transitory computer-readable storage medium of claim 11, wherein the computer model is trained to recognize food ingredients, and wherein performing the requested service on the recognized object comprises:
  identifying a food ingredient classification represented by the recognized object;
  adding the identified food ingredient to a list of identified food ingredients;
  requesting, from a server configured to provide recipe information, a set of recipes that include the food ingredients in the list of identified food ingredients;
  receiving the set of recipes that include the food ingredients in the list of identified food ingredients; and
  displaying at least one of the set of recipes at the user interface of the client device.

* * * * *